Patented Dec. 26, 1950

2,535,557

UNITED STATES PATENT OFFICE 2,535,557

EMULSION POLYMERIZATION OF UNSATURATED ORGANIC COMPOUNDS

Warren L. Walton, Schenectady, N. Y., assignor to Hercules Powder Company, Wilmington, Del., a corporation of Delaware No Drawing. Application January 27, 1948, Serial No. 4,707

13 Claims. (Cl. 260—82.7)

This invention relates to an improved process for the emulsion polymerization of unsaturated compounds and, more particularly, to an improved process of polymerizing vinyl, vinylidene, and vinylene compounds to provide improved synthetic rubber-like materials.

It is well known that unsaturated compounds, particularly those containing the vinyl group, may be advantageously polymerized in aqueous emulsion. Through use of the emulsion technique synthetic rubberlike materials have been prepared by polymerizing diolefins, halogen derivatives of diolefins or other substituted diolefins or by interpolymerizing diolefins with other compounds containing a vinyl group such as styrene, acrylic acid esters, and acrylic acid nitrile. Polymers such as polyvinyl halides, polyvinyl acetate, polystyrene, polymethyl methacrylate, and various other addition polymers also have been prepared by polymerization in aqueous emulsion. During these polymerizations a mercaptan generally has been used as a modifying agent. The purpose of the mercaptan is to control the polymerization in such a manner that polymers having a desired degree of plasticity are obtained. Fairly satisfactory results have been obtained previously through the use of aliphatic mercaptans, particularly those having at least six carbon atoms in the aliphatic group. The mercaptans known to the art have been somewhat disadvantageous, however, particularly in that in some polymerization systems it has been necessary to use an undue amount of the mercaptan in order to obtain the desired plasticity in the resulting polymer. In many polymerization systems there exists an induction period during which no substantial polymerization is taking place but during which the mercaptan is being destroyed. It has been desirable to find mercaptans which would not be destroyed during this induction period. In the case of those mercaptans, however, which have been discovered to resist destruction during the induction period, many instances have occurred wherein the mercaptans have not given the resulting polymers the desired degree of plasticity. It has been quite desirable, in other words, to discover mercaptans which not only would resist destruction during the induction period but also would give the desired plasticity to the resulting polymers.

In accordance with this invention it has been found that the polymerization of organic compounds containing the $CH_2=C<$ group and which are capable of being polymerized by a peroxide catalyst may be carried out to advantage in aqueous emulsion in the presence of a menthane thiol as the modifying agent.

In carrying out the process in accordance with this invention the polymerization of vinyl, vinylidene, and vinylene compounds is effected in the usual manner utilizing the well-known emulsion technique with the exception that the mercaptan modifier utilized constitutes a menthane thiol. The modifier used in accordance with this invention permits polymerizations to be carried out in such a manner that the polymerization reaction is adequately controlled by the use of much smaller quantities of the mercaptan than generally have been found necessary in the practice of previous emulsion polymerization process. Not only does the process of the present invention result in a saving of the quantity of mercaptan which generally has been found necessary to effect the desired control of the polymerization reaction, but it also provides an excellent yield of a polymerized material of outstanding processing properties.

The following examples are illustrative of the preparation of polymers by emulsion polymerization and the products thereof in accordance with this invention. All parts given in the examples represent parts by weight.

Example 1

A glass polymerization vessel was charged with 5.0 parts of the sodium salt of a dehydrogenated rosin (dehydroabietic acid, 54.0%; abietic acid, 0.0%; retene, 0.2%), 0.3 part of potassium persulfate, 180 parts of water, 75 parts of butadiene-1,3, 25 parts of styrene, and 0.58 part of a crude tertiary mercaptan reaction product (mercaptan sulfur, 12.0%; total sulfur, 12.7%) formed by reaction of crude carvomenthene with hydrogen sulfide. The polymerization vessel was sealed, and the vessel and its contents were agitated at 50° C. for 15.7 hours. The polymerization was stopped by the addition of about 10 parts of an aqueous hydroquinone solution containing 20 g. of hydroquinone per liter. The emulsion then was run into an open vessel containing about 50 parts of an emulsion of phenyl-$\beta$-napthylamine (equivalent to 1.0 part of phenyl-$\beta$-naphthylamine), and the polymer precipitated by the addition of about 400 parts of an aqueous sodium chloride-sulfuric acid solution prepared by dissolving 700 parts of sodium chloride and about 25 parts of concentrated sulfuric acid in about 2000 parts of water. The precipitated copolymer was thoroughly washed with water until free of acid, then dried to constant weight. After correcting the total yield to allow for nonpolymer solids, it was found that the actual conversion of monomers to copolymer was 72%. The copolymer had a Mooney viscosity of 55. On a 100% mercaptan basis, rather than on the basis of the 0.58 part of the crude tertiary mercaptan reaction product, the amount of 100% mercaptan needed to give a copolymer having a Mooney viscosity of 55 at 72% conversion would have been 0.36 part.

*Example 2*

The procedure of Example 1 was duplicated with the exceptions that the polymerization was carried out for 15.8 hours and there was used 0.32 part of substantially pure 1-methanethiol (4-isopropyl-1-methylcyclohexanethiol) as the tertiary mercaptan modifier. The 1-menthanethiol (mercaptan sulfur, 19.1%; total sulfur, 19.1%) was obtained by the fractional distillation at 30 mm. of mercury of the crude tertiary marcaptan reaction product used in Example 1, the 1-menthanethiol being collected as the fraction boiling at 118° to 120° C./30 mm. The conversion of monomers to copolymer was 72%, and the copolymer had a Mooney viscosity of 55.

*Example 3*

A glass polymerization vessel was charged with 5.0 parts of the sodium salt of a dehydrogenated rosin (dehydroabietic acid, 54.0%; abietic acid, 0.0%; retene, 0.2%), 0.3 part of potassium persulfate, 180 parts of water, 100 parts of butadiene-1,3, and 0.50 part of a distilled tertiary mercaptan reaction product (mercaptan sulfur, 19.0%; total sulfur 19.9%) formed by reaction of crude carvomenthene with hydrogen sulfide. The polymerization vessel was sealed, and the vessel and its contents were agitated at 40° C. for 47 hours. At the end of this time the polymerization reaction mixture was processed by standard procedures, and it was found that the conversion of monomer to polymer was 66%.

*Example 4*

The procedure of Example 3 was duplicated with the exceptions that there were used 75 parts of butadiene-1,3 and 25 parts of acrylonitrile as the monomers, and 0.60 part of the distilled tertiary mercaptan reaction product, and that the reaction time was 23.5 hours. The conversion of monomers to polymer was 97.6%.

*Example 5*

The procedure of Example 3 was essentially duplicated with the exceptions that there were used 100 parts of styrene as the monomer, and 0.10 part of the distilled tertiary mercaptan reaction product, and that the reaction time was 16 hours. Also, prior to sealing the polymerization vessel the free space was swept out with nitrogen. The conversion to polystyrene was 95.6% based on the amount of styrene utilized.

*Example 6*

A glass polymerization vessel was charged with 5.0 parts of a fatty acid soap (sodium salt of a mixture of palmitic and stearic acids), 0.17 part of $\alpha,\alpha$-dimethylbenzyl hydroperoxide, 0.5 part of fructose, 0.017 part of ferric sulfate nonahydrate, 1.5 parts of sodium pyrophosphate decahydrate, 180 parts of water, 100 parts of methyl methacrylate and 0.20 part of the distilled tertiary mercaptan reaction product used in Example 3. The free space in the polymerization vessel then was swept out with nitrogen, after which the vessel was sealed. The vessel and its contents were agitated at 40° C. for one hour, and it was found, after working up the polymerization reaction mixture, that the conversion to polymethyl methacrylate was 99%.

*Example 7*

$\alpha$-Terpineol was catalytically hydrogenated to dihydro-$\alpha$-terpineol over Raney nickel catalyst at a temperature of 100° C. and a pressure of 2000 pounds per square inch. The product had a bromine number of 5.6, and upon dehydration over alumina at a temperature of 300° C. and a contact time of about 20 seconds there was obtained a monocyclic terpene mixture containing principally dihydrodipentene and dihydroterpinolene. By reaction with hydrogen sulfide the monocyclic terpene mixture was converted to a crude tertiary mercaptan reaction product containing 8-menthanethiol and 4-menthanethiol. The crude reaction product (mercaptan sulfur, 10.5%; total sulfur, 10.7%) was used as the modifier in the copolymerization of butadiene-1,3 and styrene according to the process of Example 1, 0.63 part of the product being used. After a reaction time of 16.8 hours, it was found that the conversion was 73% and that the copolymer had a Mooney viscosity of 46. On a 100% mercaptan basis, the amount needed to give a copolymer having a Mooney viscosity of 55 at 72% conversion would be 0.32 part.

The menthane thiol modifiers used in the process of this invention have been illustrated in the examples by the crude tertiary mercaptan reaction product formed by reaction of carvomenthene with hydrogen sulfide, by 1-menthanethiol, the 1-menthanethiol being the pure thiol obtained through the reaction of carvomenthene with hydrogen sulfide, and by the crude tertiary mercaptan reaction product formed by reaction of hydrogen sulfide with a mixture of dihydrodipentene and dihydroterpinolene and containing 4-menthanethiol and 8-menthanethiol. Also operable in accordance with this invention, however, are those thiols obtained by the reaction of hydrogen sulfide with other monocyclic terpenes containing only one double bond, for example, 3-menthene and dihydrocritmene. A preferred method for the preparation of the secondary and tertiary menthane thiols obtainable by the reaction of hydrogen sulfide with monocyclic terpenes containing only one double bond involves reaction of the terpene with hydrogen sulfide in the presence of an activated clay, preferably an activated clay which has been so activated by treatment with a mineral acid. The preferred thiols for use in practice of the invention are the tertiary menthane thiols. The amount of thiol which may be utilized in accordance with the invention may vary from about 0.05 to about 1.0% based on the monomer, but a preferable amount of the thiol is from about 0.2 to about 0.6%. A particularly useful amount is about 0.3%.

The process of this invention may be carried out using various emulsifying agents, such as fatty acid soaps; the water-soluble salts of hydrogenated and dehydrogenated rosins or the pure acids thereof, such as dihydroabietic acid, tetrahydroabietic and dehydroabietic acid; the water-soluble salts of the amines derived from hydrogenated and dehydrogenated rosins or the pure acids thereof, for example, the acetates of dihydroabietylamine, tetrahydroabietylamine, and dehydroabietylamine; and any other emulsifying agent well known in the art. The use of the thiol modifiers of this invention is particularly advantageous when the emulsifying agent is a water-soluble salt of a modified rosin acid, such as the dihydroabietic, tetrahydroabietic and dehydroabietic acids mentioned above, due to the fact that the thiol modifying agents of this invention are not destroyed as quickly as the modifying agents previously known to the art during the induction period which usually is associated with the use of water-soluble salts of modified rosin acids as emulsifying agents. The rosin amines mentioned above may be prepared by converting the acids in the rosin material to the corresponding nitriles by treatment with ammonia under dehydrating conditions and then reducing the nitriles to the amines by catalytic hydrogenation.

Most of the examples, however, have shown the use of a salt of dehydrogenated rosin as emulsifying agent. Such salts are prepared by neutralization of a dehydrogenated rosin with an alkali metal compound basic in characteristics, such as the hydroxides and carbonates of sodium and potassium. The dehydrogenated rosins are prepared by the dehydrogenation or disproportionation of natural rosin or a rosin material containing a substantial amount of a natural rosin. The dehydrogenation or disproportionation reaction is carried out by contacting the rosin or rosin material at an elevated temperature with an active hydrogenation catalyst in the absence of added hydrogen. Catalysts such as palladium, platinum, nickel, and copper chromite are suitable and may be supported on a carrier such as granular alumina, fibrous asbestos or activated charcoal. The catalytic treatment may be conducted either by a batchwise or continuous procedure. The rosin may be agitated, for example, with about 5% to about 20% by weight of a palladium catalyst supported on activated carbon (1% to 2% palladium) at about 150° C. to about 300° C. for about 1 hour to about 5 hours. In the continuous process the molten rosin flows over the supported palladium catalyst at a temperature within the range of about 225° C. to about 300° C. to provide a contact time of about ¼ hour to about 1 hour.

It often is advantageous to refine the whole rosin prior to its dehydrogenation or disproportionation and the same is true as applied to the whole dehydrogenated or disproportionated product. Prior to its dehydrogenation or disproportionation the rosin may be refined by crystallization, by means of a selective solvent such as furfural or phenol, or by an absorbent earth such as fuller's earth. The dehydrogenated or disproportionated rosin product may be refined by distillation, heat-treatment, alkali extraction, precipitation, etc. It is desirable that the dehydrogenated or disproportionated rosin or derivative thereof contain at least 45% and preferably at least 50% dehydroabietic acid. The dehydrogenated or disproportionated rosin also should contain less than 1% abietic acid.

The examples have shown the use of potassium persulfate and $\alpha,\alpha$-dimethylbenzyl hydroperoxide as catalysts, but other peroxide catalysts also are operable. Exemplary of such catalysts are benzoyl peroxide, tertiary butyl hydroperoxide, $\alpha,\alpha$-dimethyl-p-methylbenyl hydroperoxide, $\alpha,\alpha$-dimethyl-p-isopropylbenzyl hydroperoxide, triethylmethyl hydroperoxide, and the commercial hydroperoxide mixture containing 1,2-dimethylcyclophenyl, 1,3-dimethylcyclopentyl, methylcyclohexyl, dimethylcyclohexyl and some heptyl and octyl hydroperoxides. The amount of catalyst which may be used in accordance with this inventon may be from about 0.001 to about 5.0%, based on the monomers, a desirable range being from about 0.02 to about 1.5%, and the preferable amount of catalyst on this basis being from about 0.1 to about 0.6%.

The polymerization reaction mixtures of this invention also may include an activator, as shown in Example 6. Such an activator may be what is known as a redox system which comprises usually a salt of a heavy metal such as iron, cobalt, nickel, copper, silver, zinc, cadmium, mercury, chromium, manganese, or molybdenum associated with a complex-forming compound such as a pyrophosphate, oxalate, citrate, tartrate or salicylate. The redox system therefore comprises essentially a heavy metal complex wherein the metal is united to another element through coordinate covalences rather than by primary valences. The redox system, however, also may include an $\alpha$-hydroxycarbonyl compound or a compound behaving as an $\alpha$-hydroxycarbonyl compound. Illustrative of such $\alpha$-hydroxycarbonyl compounds are the $\alpha$-hydroxy aldehydes and ketones which in turn are representative of that class of polyhydroxy aldehydes and ketones known as reducing sugars. In the redox system the preferable water-soluble heavy metal salt is one derived either from ferric or ferrous iron. Based on the monomers the amount of heavy metal salt may be from about 0.0003 to about 1.0%, a highly useful range being from about 0.003 to about 0.35%, and the preferable range being from about 0.01 to about 0.1%. Likewise, the preferable reducing sugars are the keto sugars; particularly suitable is fructose. The amount of the reducing sugar based on the monomer may be from about 0.001 to 4%, a preferable range on this basis being from about 0.01 to about 1%. A highly useful range is from about 0.2 to about 0.5%. Particularly applicable is an amount of sugar based on the monomer of 0.5%.

Compounds which may be advantageously polymerized in aqueous emulsion by means of the process of this invention include the conjugated butadienes such as butadiene-1,3, isoprene, 2,3-dimethyl butadiene-1,3, chloroprene, piperylene, monomer mixtures of two or more of these butadienes such as a mixture of butadiene-1,3 and 2,3-dimethyl butadiene-1,3, and monomer mixtures of one or more of these conjugated butadienes with vinyl compounds such as styrene, p-chlorostyrene, p-methoxystyrene, vinyl naphthalene, acrylic acid, acrylonitrile, methacrylonitrile, methyl acrylate, methyl methacrylate, methyl vinyl ketone, methyl isopropenyl ketone, and the like. The process of this invention has been found to be particularly applicable in the preparation of the copylmers of butadiene and styrene or acrylonitrile, the copolymers of isoprene and styrene or acrylonitrile, and other rubber-like copolymers, as well as in the preparation of the copolymers of isobutylene and acrylonitrile, and polymers such as polyvinyl chloride, polyvinyl acetate, polystyrene, polymethylmethacrylate, polyvinylidene chloride, polyvinyl pyridine, and the various other addition polymers which may be prepared by the emulsion technique.

The polymerizations may generally be carried out under the same reaction conditions known in the art for emulsion polymerization, for example, concentration of reactants, temperature, pressure and the like. The temperature of the reaction may be varied from about 0° to about 100° C., the preferable range from the standpoint of reaction rate being from about 40° to about 60° C., but it is possible through use of the thiol modifiers of this invention to obtain satisfactory polymers at lower temperatures, for example, 15° C.

The process in accordance with this invention, using as modifying agents a menthane thiol, preferably a tertiary menthane thiol, permits the attainment of a high yield of polymer in a relatively short reaction time, the polymer so obtained having excellent processing properties due to its satisfactory plasticity. The menthane thiols used in accordance with this invention are advantageous over the thiols previously utilized by the art in that a smaller amount of the menthane thiol usually is required to give the desired plasticity to the polymer at a level of conversion of monomer to polymer which is commercially satisfactory. The menthane thiols also are advantageous in that they exhibit no inhibiting properties upon the polymerization. In other words, satisfactory conversion of monomer to polymer is obtained in a reasonable reaction time. The menthane thiols of this invention are particularly useful in those polymerization systems wherein an induction period exists; i. e., wherein there exists initially a rather long period of limited reaction. The use of thiols previously known to the art in polymerizations wherein a considerable length of time elapses during which the components of the polymerization emulsion attain a level of reactivity at which substantial polymerization begins, has been disadvantageous due to the fact that during the period of limited reaction the consumption of the previously known thiols has been high. In contrast, the menthane thiols of this invention are not appreciably affected during such an induction period. It is quite apparent therefore that the amount of menthane thiol may be kept at a minimum necessary to impart the desired degree of plasticity and that the resulting cost necessary to impart modification to the polymer will be reduced.

The menthane thiols of this invention are advantageous over those thiols prepared from terpenes other than those which are monocyclic and contain only one double bond. The crude thiols of this invention are not only good modifiers but also permit a satisfactory conversion of monomer to polymer in a reasonable reaction time. In contrast, the crude thiols prepared from terpenes such as dipentene, α-pinene, β-pinene and the like do not exhibit both of these desirable properties. With the latter thiols a fractional distillation is necessary to give a product which will exhibit a good reaction time, but even then the product is generally inferior in both reaction time and modifying ability.

What I claim and desire to protect by Letters Patent is:

1. The process which comprises polymerizing an organic compound containing the $CH_2=C<$ group and which is capable of being polymerized by a peroxide catalyst, in aqueous emulsion in the presence of a tertiary menthane thiol in an amount of about 0.05% to about 1.0% based on the monomeric material.

2. The process which comprises polymerizing an organic compound containing the $CH_2=C<$ group and which is capable of being polymerized by a peroxide catalyst, in aqueous emulsion in the presence of 1-menthanethiol in an amount of about 0.05% to about 1.0% based on the monomeric material.

3. The process which comprises polymerizing an organic compound containing the $CH_2=C<$ group and which is capable of being polymerized by a peroxide catalyst, in aqueous emulsion in the presence of 4-menthanethiol in an amount of about 0.05% to about 1.0% based on the monomeric material.

4. The process which comprises polymerizing an organic compound containing the $CH_2=C<$ group and which is capable of being polymerized by a peroxide catalyst, in aqueous emulsion in the presence of 8-menthanethiol in an amount of about 0.05% to about 1.0% based on the monomeric material.

5. The process which comprises polymerizing in aqueous emulsion a conjugated butadiene hydrocarbon in the presence of a tertiary menthane thiol in an amount of about 0.05% to about 1.0% based on the monomeric material.

6. The process which comprises copolymerizing a mixture of a conjugated butadiene hydrocarbon and another organic compound containing the $CH_2=C<$ group and which is capable of being polymerized by a peroxide catalyst, in aqueous emulsion in the presence of a tertiary menthane thiol in an amount of about 0.05% to about 1.0% based on the monomeric material.

7. The process which comprises copolymerizing in aqueous emulsion a mixture of butadiene-1,3 and styrene in the presence of a tertiary menthane thiol in an amount of about 0.05% to about 1.0% based on the monomeric material.

8. The process which comprises copolymerizing in aqueous emulsion a mixture of butadiene-1,3 and acrylonitrile in the presence of a tertiary menthane thiol in an amount of about 0.05% to about 1.0% based on the monomeric material.

9. The process which comprises polymerizing in aqueous emulsion a conjugated butadiene hydrocarbon in the presence of 1-menthanethiol in an amount of about 0.05% to about 1.0% based on the monomeric material.

10. The process which comprises copolymerizing in aqueous emulsion a mixture of butadiene-1,3 and styrene in the presence of 1-menthanethiol in an amount of about 0.05% to about 1.0% based on the monomeric material.

11. The process which comprises copolymerizing in aqueous emulsion a mixture of butadiene-1,3 and acrylonitrile in the presence of 1-menthanethiol in an amount of about 0.05% to about 1.0% based on the monomeric material.

12. The process which comprises copolymerizing in aqueous emulsion a mixture of butadiene-1,3 and styrene in the presence of 4-menthanethiol in an amount of about 0.05% to about 1.0% based on the monomeric material.

13. The process which comprises copolymerizing in aqueous emulsion a mixture of butadiene-1,3 and styrene in the presence of 8-menthanethiol in an amount of about 0.05% to about 1.0% based on the monomeric material.

WARREN L. WALTON.

REFERENCES CITED

The following references are of record in the file of this patent:

UNITED STATES PATENTS

| Number | Name | Date |
|---|---|---|
| 2,378,030 | Olin | June 12, 1945 |
| 2,416,440 | Fryling | Feb. 25, 1947 |
| 2,418,782 | Mark et al. | Apr. 8, 1947 |

OTHER REFERENCES

Snyder et al.: J. A. C. S., vol. 68, August 1946, pages 1422–1428.

Certificate of Correction

Patent No. 2,535,557                                                        December 26, 1950

WARREN L. WALTON

It is hereby certified that error appears in the printed specification of the above numbered patent requiring correction as follows:

Column 3, line 17, for "marcaptan" read *mercaptan*; column 5, line 70, for "cyclophenyl" read *cyclopentyl*;

and that the said Letters Patent should be read as corrected above, so that the same may conform to the record of the case in the Patent Office.

Signed and sealed this 27th day of February, A. D. 1951.

[SEAL]

THOMAS F. MURPHY,
*Assistant Commissioner of Patents.*